US009485450B2

(12) United States Patent
Yamaji et al.

(10) Patent No.: US 9,485,450 B2
(45) Date of Patent: Nov. 1, 2016

(54) CONTENTS DISPLAY DEVICE, CONTENTS DISPLAY METHOD, AND COMPUTER READABLE MEDIUM FOR STORING CONTENTS DISPLAY PROGRAM

(75) Inventors: Kei Yamaji, Kanagawa (JP); Kazuhiro Mino, Kanagawa (JP); Daisuke Kobayashi, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1016 days.

(21) Appl. No.: 12/499,864

(22) Filed: Jul. 9, 2009

(65) Prior Publication Data

US 2010/0007796 A1    Jan. 14, 2010

(30) Foreign Application Priority Data

Jul. 11, 2008    (JP) ................................. 2008-181664

(51) Int. Cl.
| | |
|---|---|
| H04N 5/445 | (2011.01) |
| H04N 5/232 | (2006.01) |
| H04N 5/77 | (2006.01) |
| H04N 21/4223 | (2011.01) |
| H04N 21/431 | (2011.01) |
| H04N 21/4415 | (2011.01) |
| H04N 21/442 | (2011.01) |

(52) U.S. Cl.
CPC ...... *H04N 5/44591* (2013.01); *H04N 5/23219* (2013.01); *H04N 5/77* (2013.01); *H04N 21/4223* (2013.01); *H04N 21/4312* (2013.01); *H04N 21/4316* (2013.01); *H04N 21/4415* (2013.01); *H04N 21/44218* (2013.01)

(58) Field of Classification Search
None
See application file for complete search history.

(56) References Cited

U.S. PATENT DOCUMENTS

| | | | | |
|---|---|---|---|---|
| 2001/0006382 | A1* | 7/2001 | Sevat | 345/169 |
| 2002/0042921 | A1* | 4/2002 | Ellis | 725/87 |
| 2002/0054206 | A1* | 5/2002 | Allen | 348/14.04 |
| 2003/0237093 | A1* | 12/2003 | Marsh | G06F 3/0481 725/46 |
| 2004/0170415 | A1 | 9/2004 | Maeda et al. | |

(Continued)

FOREIGN PATENT DOCUMENTS

| | | |
|---|---|---|
| JP | 2000-222133 | 8/2000 |
| JP | 2003-061016 | 2/2003 |
| JP | 2006-020105 | 1/2006 |

OTHER PUBLICATIONS

Japanese Office Action dated Jun. 19, 2012 in corresponding Japanese Application No. 2008-181664 with its partial English translation.

*Primary Examiner* — Hunter B Lonsberry
*Assistant Examiner* — Michael Telan
(74) *Attorney, Agent, or Firm* — Young & Thompson

(57) ABSTRACT

A contents display device configured to enable one or more users to perform screen operations of an application, comprises: a plurality of operating units respectively that executes operations of a screen; a contents storing unit that stores contents to be displayed on the screen; an operation information acquiring unit that acquires operation information related to an operating situation of each operating unit by the one or more users; a screen dividing unit that divides the screen based on the operation information acquired by the operation information acquiring unit; a display unit that displays contents stored in the contents storing unit based on the operation information acquired by the operation information acquiring unit on the screen divided by the screen dividing unit; and a process executing unit that executes operations performed by each operating unit.

21 Claims, 9 Drawing Sheets

(56) References Cited

U.S. PATENT DOCUMENTS

| | | | |
|---|---|---|---|
| 2005/0105806 A1* | 5/2005 | Nagaoka et al. | 382/224 |
| 2006/0107297 A1* | 5/2006 | Toyama et al. | 725/105 |
| 2007/0294632 A1* | 12/2007 | Toyama et al. | 715/764 |
| 2009/0133051 A1* | 5/2009 | Hildreth | 725/28 |
| 2009/0164896 A1* | 6/2009 | Thorn | 715/700 |

* cited by examiner

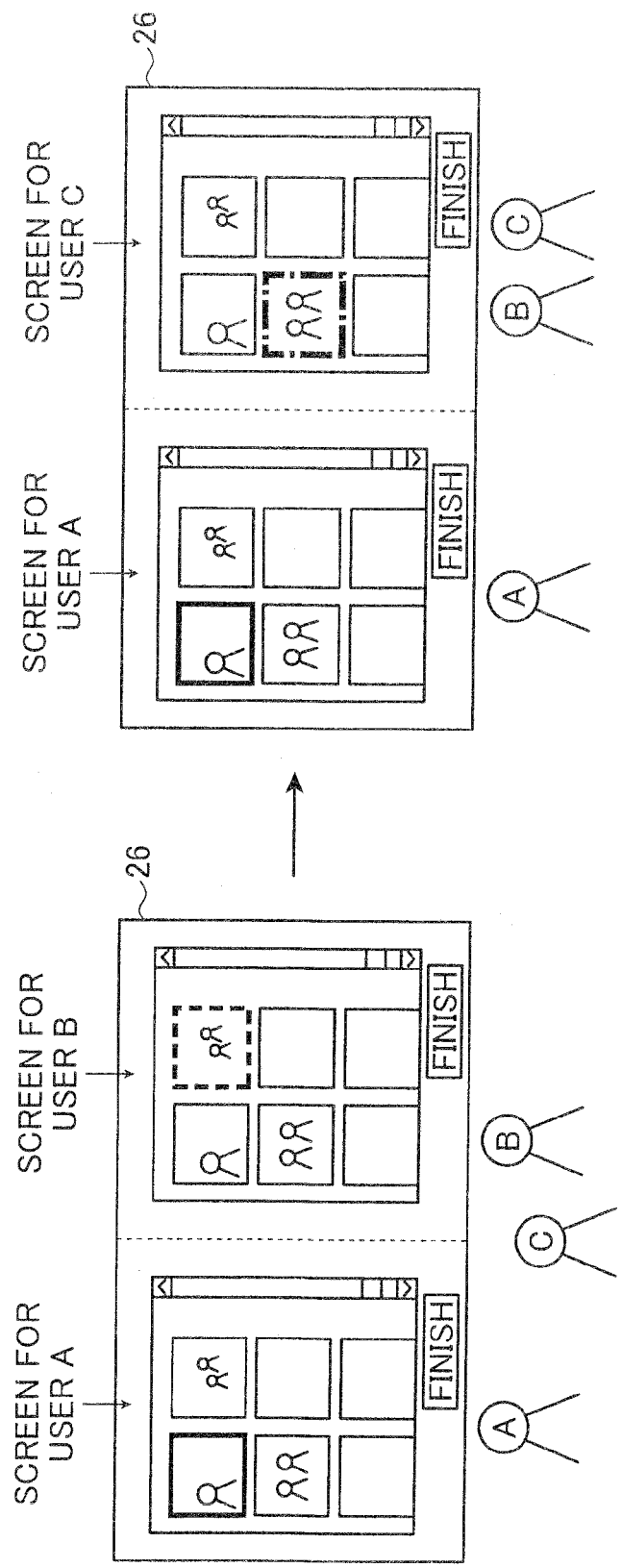

CONTENTS DISPLAY DEVICE, CONTENTS DISPLAY METHOD, AND COMPUTER READABLE MEDIUM FOR STORING CONTENTS DISPLAY PROGRAM

BACKGROUND OF THE INVENTION

1. Field of the Invention

The present invention relates to a contents display device, contents display method, and computer readable medium for storing a contents display program when a plurality of users operates an application.

2. Description of the Related Art

In recent years, there have been proposed various image display devices each of which enables a plurality of users to simultaneously operate an application on a single screen. There has also been proposed a method for each user to simultaneously perform his or her own desired operation by setting an operation region per user in accordance with the users who perform operations.

Proposed methods of screen display when such operations are performed by a plurality of users on the same screen include a method wherein the number of users who perform operations is inputted in advance so as to divide the screen into a corresponding number of display regions. For example, in JP 2003-61016 A is proposed an image display for a plurality of users to simultaneously place orders in a device that creates photograph stickers from images taken by a digital camera. In JP 2003-61016 A, the user selects the number by which the stickers are to be divided, that is, the number of users, and the corresponding arranged locations so that, based on the contents selected by the user, the screen is divided according to the number of users, making it possible to execute display and ordering in accordance with each user per divided region.

Further, in JP 2006-20105 A is disclosed filming equipment configured to combine and record the best images among those of a plurality of different subjects that were selected one by one on a per subject basis. In JP 2006-20105 A is described a method of scrolling and adjusting the screen in a case where there is a large number of subjects, thereby preventing the number of divided regions from becoming so large as to make each region too small. Further, in JP 2006-20105 A is described a method of formatting an image to be displayed at a view angle that is optimum for the divided region size.

However, in JP 2003-61016 A, when the screen is divided, the user needs to input the number of users. Also, the screen is divided so that uniform screen regions are provided under the same conditions regardless of the user. Further, while JP 2006-20105 A discloses a display method specific to the number of divided regions, which enables scrolling of the screen and adjustment of the view angle when the number of divided regions becomes to large, the document does not describe a specific division method for each user.

SUMMARY OF THE INVENTION

It is therefore an object of the present invention to solve the above-described problems of prior art and provide a contents display device, contents display method, and computer readable medium for storing a contents display program which are capable of dividing a screen in accordance with the information of each user or the conditions of each operating device and displaying the contents associated with each divided region in a case where a plurality of users simultaneously operate an application or in a case where a single user operates an application using a plurality of operating devices.

A contents display device according to the present invention comprises: a plurality of operating units respectively that executes operations of a screen; a contents storing unit that stores contents to be displayed on the screen; an operation information acquiring unit that acquires operation information related to an operating situation of each operating unit by the one or more users; a screen dividing unit that divides the screen based on the operation information acquired by the operation information acquiring unit; a display unit that displays contents stored in the contents storing unit based on the operation information acquired by the operation information acquiring unit on the screen divided by the screen dividing unit; and a process executing unit that executes operations performed by each operating unit.

A contents display method according to the present invention comprises the steps of: acquiring, from a plurality of operating units for performing operations on a screen, operation information related to an operating situation of each operating unit by the one or more users; dividing the screen based on the acquired operation information; displaying contents stored in advance on the divided screen based on the acquired operation information; and executing operations performed by each operating unit.

A computer readable medium according to the present invention is one configured to store a program for executing on a computer, the program comprising the steps of: acquiring, from a plurality of operating units respectively performing operations on a screen, operation information related to an operating situation of each operating unit by one or more users; dividing the screen based on the acquired operation information; displaying contents stored in advance on the divided screen based on the acquired operation information; and executing operations performed by each operating unit.

BRIEF DESCRIPTION OF THE DRAWINGS

FIG. 12 is a view illustrating another example of image display in operated regions when there are three users.

DETAILED DESCRIPTION OF THE INVENTION

The following describes in detail the contents display method and contents display device of the present invention based on the preferred embodiments shown in accompanying drawings.

Figure 1:
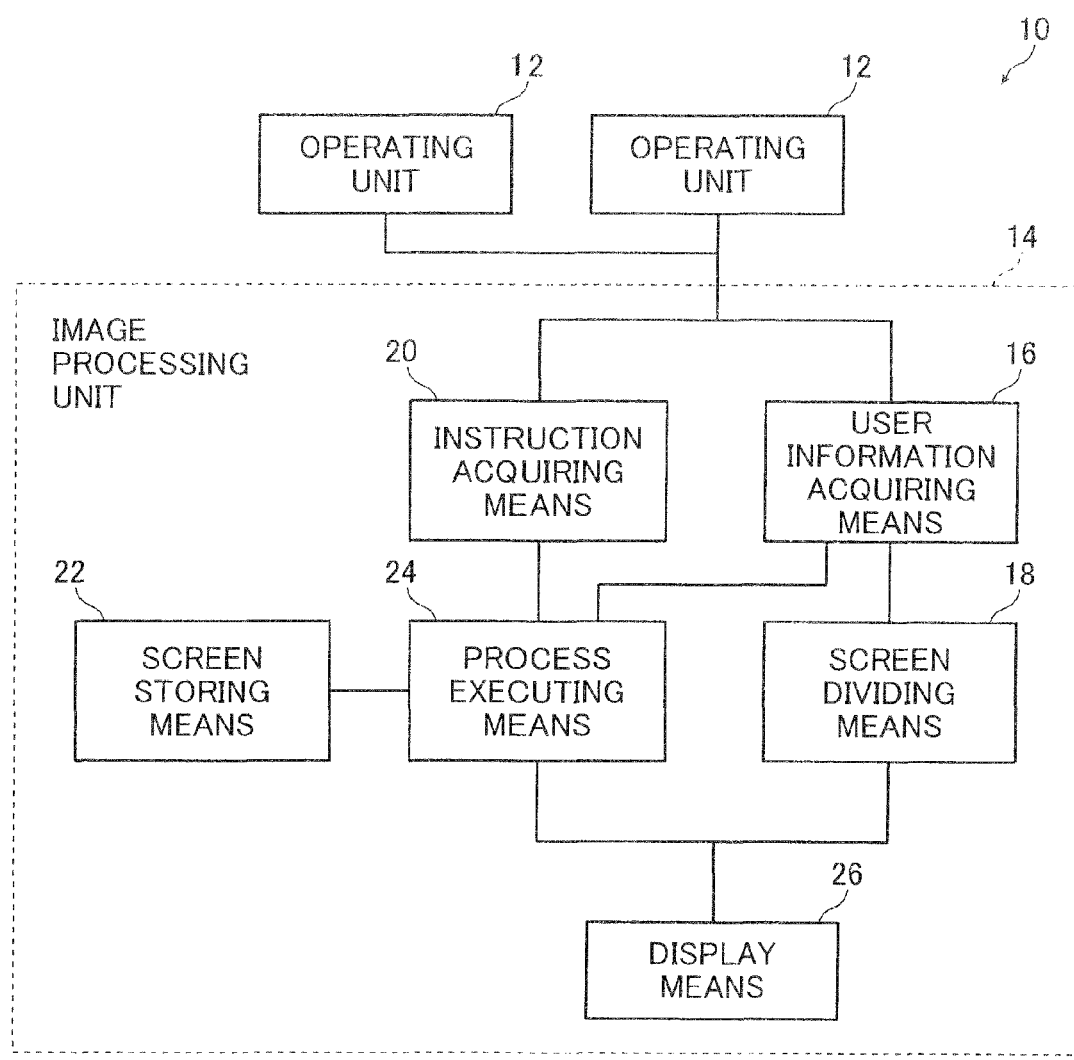
FIG. 1 is a block diagram illustrating a configuration of a contents display device according to an embodiment of the present invention.

FIG. 1 is a block diagram illustrating a configuration of a contents display device 10 according to an embodiment of the present invention. The contents display device 10 displays an operation screen of an application related to displaying, editing, and ordering contents, such as images taken by filming equipment, and enables a plurality of users to simultaneously perform operations on the same screen.

Here, the term "contents" includes all data that can be handled digitally, such as image data, including those of static images, dynamic images, and images of components used for image decoration, audio data, and music data.

While an illustrative scenario in which static image data are used as the contents is described in this embodiment, the present invention is not limited to static image data and may be similarly used with other contents as well.

The contents display device 10 comprises at least two operating units 12 for enabling a user to provide image editing and ordering instructions, and an image processing unit 14 configured to display the operated screen of the application and execute the processing corresponding to the instructions from these operating units 12.

The image processing unit 14 comprises user information acquiring means 16, screen dividing means 18, instruction acquiring means 20, image storing means 22, process executing means 24, and display means 26.

The operating unit 12 provides execution instructions on the screen of the display means 26 when the user executes image editing, ordering, and the like using the contents display device 10.

The specific form of the operating unit 12 is not particularly limited, and any of the various known operating devices may be used, such as a remote controller, handheld device, mouse, or touch-pen.

At least two of the operating units 12 are assigned to at least two or more users. The user information (operation information) of the user who uses each operating unit 12 is set in advance in each operating unit 12. With this arrangement, the image processing unit 14 is capable of identifying each user operating each operating unit 12. Furthermore, in the present invention, a single user may use a plurality of operating units 12.

When a single user provides instructions to the image processing unit 14 from the corresponding operating unit 12, the operating unit 12 provides the editing or ordering instructions by sending the instruction information and its own user information to the instruction acquiring means 20 of the image processing unit 14. The operation of the operating unit 12 is linked with the movement of a pointer provided for the corresponding operating unit 12 and displayed on the display means 26, making it possible for the user to operate the operating unit 12 while viewing the position and movement of the pointer.

The user information acquiring means 16 acquires the user information held by each operating unit 12.

The user information is used to identify the user who provided instructions to the image processing unit 14 via the corresponding operating unit 12, and includes user identification information unique to each user and user position information which indicates the user's position relating to the display means 26 of the image processing unit 14. Further, the user information may also include data such as the facial image, age, and height of each user.

A method of acquiring the user information is not particularly limited, and any of the various known methods may be used.

The user information acquiring means 16 periodically acquires user information from each operating unit 12 based on a predetermined time interval.

Figure 15:
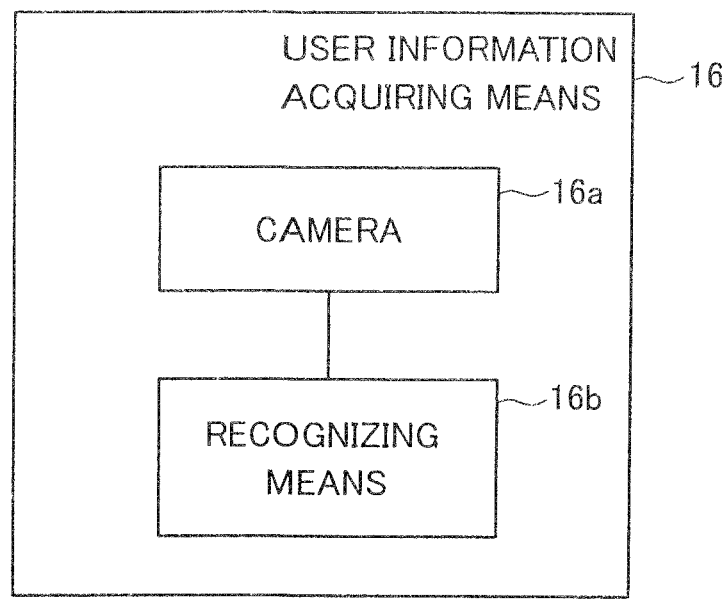
FIG. 15 is a block diagram illustrating a configuration of user information acquiring means.

For example, in one possible method for acquiring user identification information, the user identification information of each user operating each operating unit 12 is set in advance and the corresponding user identification information is sent to the image processing unit 14 when the operating unit 12 is operated. Other possible methods include a method wherein the user information acquiring means 16 includes a camera 16a and a recognizing means 16b as shown in FIG. 15, and the user identification information of each user is stored in advance in association with a user facial image in the image processing unit 14, etc., an image of the user operating the operating unit 12 is taken by the camera 16a, the face of the user is detected, the user is recognized by face authentication with the recognizing means 16b, and the user identification information corresponding to the user is acquired.

One possible method for acquiring position information is, for example, a method wherein an image of the operating unit 12 is taken by the camera 16b so as to detect the position and distance of the operating unit 12 from the image processing unit 14 by the recognizing means 16b. Other possible methods include a method wherein an image of the user operating the operating unit 12 is taken by a camera, the face of the user is detected, and the position and distance of the user from the image processing unit 14 are detected from the size of the face, etc. Further, the operating unit 12 itself may be provided with a function capable of detecting the distance from the display means 26. Furthermore, in a case where the operating unit 12 utilizes a touch pen or touch panel, the method employed may be a method wherein the movement of the operating unit 12 is set for each user as an operation pattern, the user identification information of each user is stored in association with the user operation pattern, and the user identification information corresponding to the user is acquired based on the movement (operation pattern) made by the operating unit 12.

Additionally, the user information acquiring means 16 is capable of detecting the number of users performing operations or the number of operated operating units 12 from the detected user identification information.

The user information acquiring means 16 sends the acquired user identification information and the information on the number of users or the number of operated operating units 12 to the screen dividing means 18.

The screen dividing means 18 performs the control required for dividing the screen of the display means 26 into regions for each user based on the user identification information received from the user information acquiring means 16 and the information on the number of users or the number of operated operating units 12.

The instruction acquiring means 20 acquires the instruction information sent from each operating unit 12 and the corresponding user identification information, and sends this information to the process executing means 24. The instructions received by the instruction acquiring means 20 are mainly related to editing and ordering the images on the screen of the display means 26.

The user identification information simultaneously sent when instruction information is sent from each operating unit 12 to the image processing unit 14 may be received by the instruction acquiring means 20, or the user identification information may be acquired using the same method as that of the user information acquiring means 16 described above.

The image storing means 22 acquires and stores the image data supplied for editing and ordering in the contents display device 10. The image data stored in the image storing means 22 are not particularly limited. For example, image data taken by a user using filming equipment such as a camera or image data downloaded from a network may be directly obtained by connecting the filming equipment to the contents display device 10 or indirectly obtained via a network and stored in the image storing means 22.

The image data stored in the image storing means 22 are displayed on the display means 26 as necessary.

The process executing means 24 selects and displays the images to be displayed on the display means 26 from the image data stored in the image storing means 22. Image selection is performed based on the user identification information acquired by the user information acquiring means 16.

The process executing means 24 also performs processing such as the editing and ordering of displayed images, based on the instruction information acquired by the instruction acquiring means 20 and the corresponding user identification information.

The display means 26 displays an operation screen for image data editing and ordering in the application. Each user performs application operations on the screen using the corresponding operating unit 12 while viewing the display means 26.

Next, the specific operation of the embodiment will be described.

First, the method of dividing the screen for each user of the screen of the display means 26 will be described.

Figure 2:
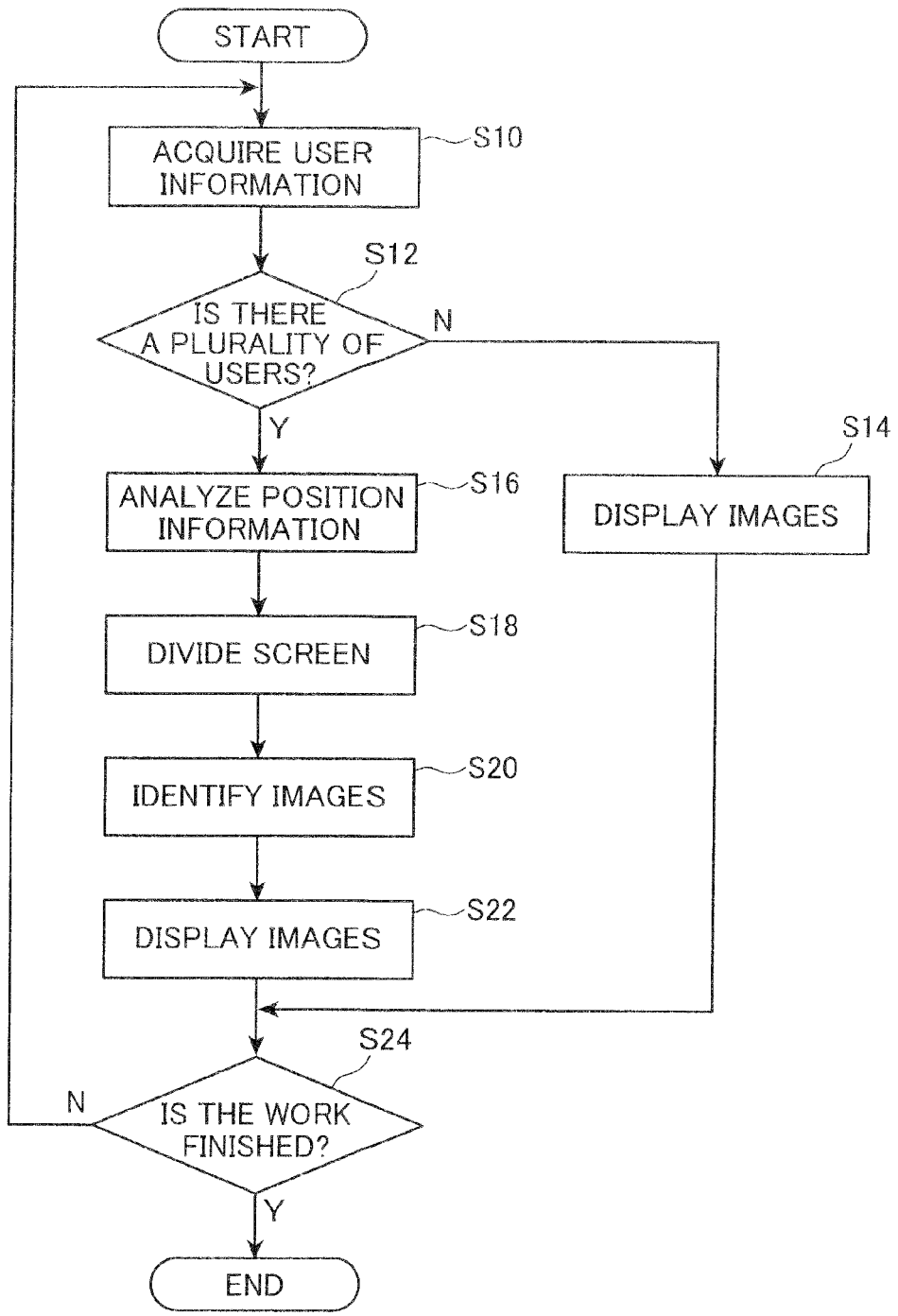
FIG. 2 is a flowchart showing the operation of the embodiment.

In the flowchart shown in FIG. 2, first, when the application is started, in step S10, the user information acquiring means 16 acquires the user information (including user identification information and position information) of each operating unit 12. This user information is then sent to the screen dividing means 18.

The screen dividing means 18 detects the number of users who are to perform operations from the number of acquired sets of user identification information.

When the number of acquired sets of user identification information is one, that is, when the number of users is one (in the case of N in step S12), the screen dividing means 18 does not need to divide the screen when displaying the screen on the display means 26, a normal screen is displayed in step S14, and the user operates the operating unit 12 so as to edit and order images, etc., while viewing the screen.

On the other hand, when the acquired number of sets of user identification information is two or more, that is, when the number of users is a plurality of users of two or more (in the case of Y in step S12), the image dividing means 18 analyzes the position information of the received user information in step S16, and divides the display region of the display means 26 in accordance with the analytical results in step S18.

Now, the method of dividing the screen will be described in detail.

First, FIG. 3 to FIG. 6 illustrates cases where two users, user A and user B, perform operations using the corresponding operating units 12.

Figure 3:
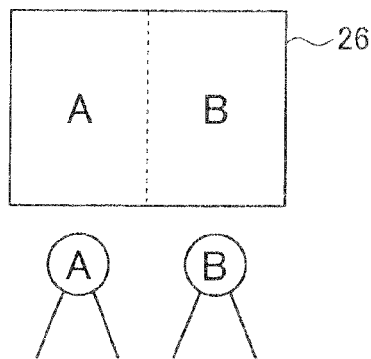
FIG. 3 is a view illustrating an example of screen division when there are two users.

Upon receipt of the user identification information and position information of users A and B, the user information acquiring means 16 sends that information to the screen dividing means 18. The screen dividing means 18 then detects from the user identification information that there are two users, and divides the display region of the display means 26 into two regions, a left region and a right region as shown in FIG. 3. Furthermore, the screen dividing means 18 detects the positions of users A and B from the position information.

In the example shown in FIG. 3, user A is positioned on the left side and user B is positioned on the right side of the screen of the display means 26, each at about the same distance from the display means 26. At this time, the image dividing means 18 respectively displays the screen to be operated by user A on the left half and the screen to be operated by user B on the right half of the screen of the display means 26. In order to detect a change in user position information, the user information acquiring means 16 periodically acquires the user information of each user at a predetermined time interval.

With this arrangement, when users A and B simultaneously perform screen operations on the same screen, it is possible to display a screen that is easy-to-view and easy-to-operate from each position.

Figure 4:
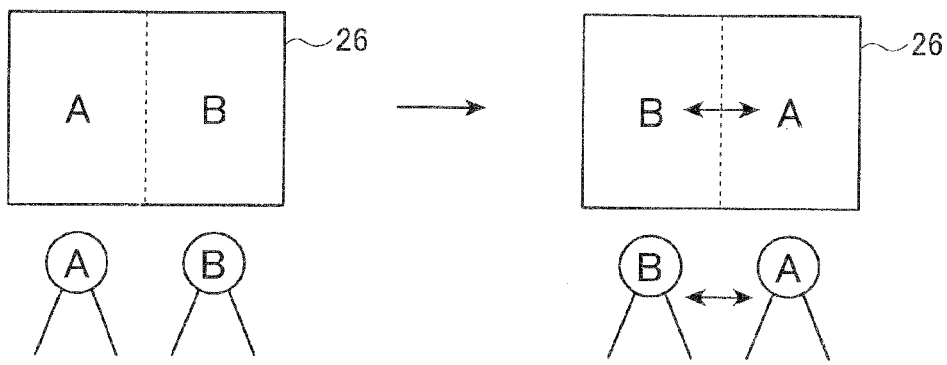
FIG. 4 is a view illustrating an example of screen division when a user moves to another location.

In the event a user moves to another location while performing operations, the display of the display means 26 changes in accordance with the new location of the user. In FIG. 4, when user A and user B are initially positioned on the left side and the right side of the screen, respectively, as in FIG. 3, the screen operated by user A and the screen operated by user B are displayed on the left half and the right half of the screen, respectively.

Here, let's assume that both users A and B move so that user A is positioned on the right side of the screen and user B is positioned on the left side of the screen. At this time, the screen dividing means 18 changes the screen display in accordance with user movement so that the screen operated by user A and the screen operated by user B are displayed on the right half and the left half of the screen, respectively.

With this arrangement, even in the event users move, it is possible to detect these movements and achieve a screen display that is easy-to-view and easy-to-operate from each position of each user.

Further, in a case where a user has moved away from the display means 26 by a certain distance or more, the screen dividing means 18 cancels the display of the screen operated by that user based on user position information. For example, in a case where the operating unit 12 is a handheld device such as a remote controller and the user is positioned at a distance that does not permit operation of the screen of the display means 26 by the operating unit 12, or in a case where the operating unit 12 is a mouse or touch pen and the user is positioned at a distance from which the operating unit 12 cannot be reached, the screen dividing means 18 cancels the display of the screen for that user.

Figure 5:
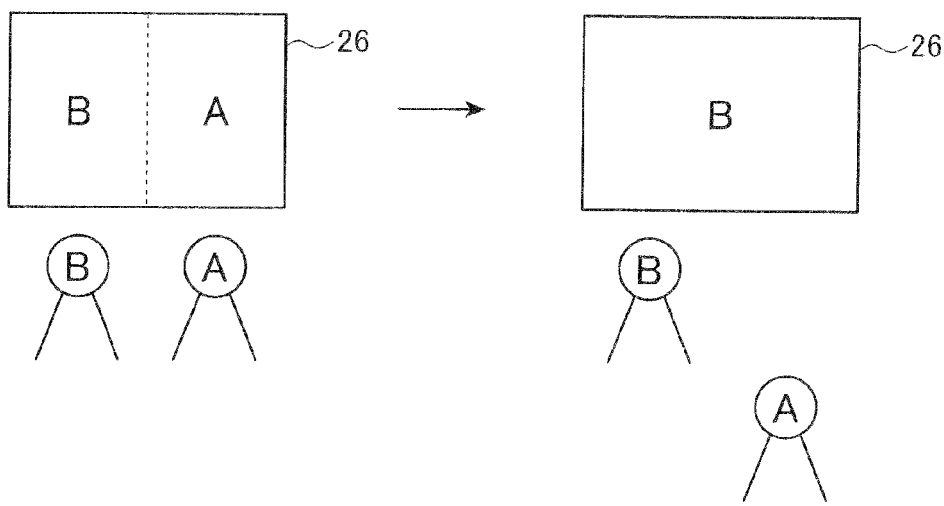
FIG. 5 is a view illustrating an example of screen division when a user is located far away from the display means.

As shown in FIG. 5, when user A and user B are initially positioned on the right side and the left side of the screen, respectively, the screen operated by user A and the screen operated by user B are displayed on the right half and the left half of the screen, respectively. Here, when user A pauses screen operations and moves away from the display means 26 by a distance that does not permit screen operations, the screen dividing means 18 cancels the display of the screen operated by user A. Then, the screen dividing method is switched so as to display only the screen operated by the remaining user B. In such a case, since there is only one user, the screen dividing means 18 may display the screen operated by the user B using the entire screen, without dividing the screen.

With this arrangement, in a case where the user leaves his or her desk for a break or other engagement, the screen dividing means 18 is capable of canceling the display of the user screen that is no longer required and increasing the sizes of the screens currently operated by other users accordingly. That is, the screen dividing means 18 is capable of displaying a screen that is easy-to-operate by users without including any needless displays.

When user A returns to a position where the display means 26 is once again operable, the screen dividing means 18 may split the screen once again and display the respective screens operated by users A and B. For this reason, when the display of the screen of user A on the display means 26 is cancelled, the contents of the screen of user A at the time of cancellation are preferably temporarily stored.

Figure 6:
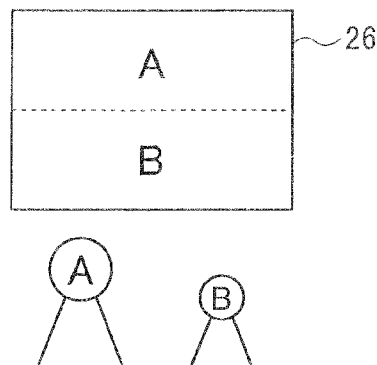
FIG. 6 is a view illustrating an example of screen division in accordance with user height and age.

Furthermore, the screen may be divided based on the physical features of the users, such as age and height. For example, in a case where there are two users, user A and user B, as shown in FIG. 6, the screen is divided widthwise. Then, in a case where user A is taller than user B, the upper half of the screen is assigned to user A as the operation screen, and the lower half of the screen is assigned to user B as the operation screen. Or, in a case where user A is an adult and user B is a child, the upper half of the screen may be assigned to user A as the operation screen, and the lower half of the screen may be assigned to user B as the operation screen.

As a result, the ages and heights of the users are preferably preset in advance on the side of the operating unit 12 as user information, and the user information acquiring means 16 preferably acquires and sends this information to the screen dividing means 18. In a case where the camera 16a is used to detect user position information, the user height may be estimated from a photographed image of the user, or the user age may be estimated from the facial image of the user, and the results thereof may be used.

In a case where there is a difference in both height and age among the users, the method illustrated in FIG. 6 may be used to divide and display the screen so that it is easy-to-view and easy-to-operate by each user.

Further, in a case where three or more users simultaneously operate the screen, the screen may be similarly divided.

Figure 7A:
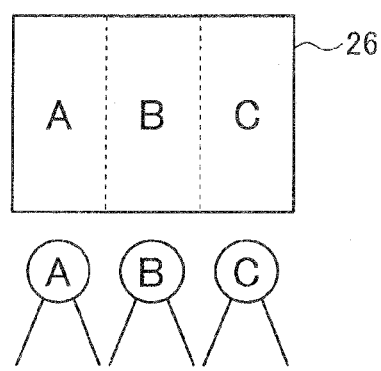
FIGS. 7A and 7B each illustrate an example of screen division when there are three or more users.

For example, in a case where there are three users, as shown in FIG. 7A, the screen may be divided lengthwise so that the screens operated by each user are displayed in each divided region based on the position information of each user. In the example of FIG. 7A, since users A, B, and C are positioned in that order from the left side of the screen with respect to the display means 26, on the screen as well, the left side, center, and right side of the screen may be assigned to user A, user B, and user C, respectively.

Figure 7B:
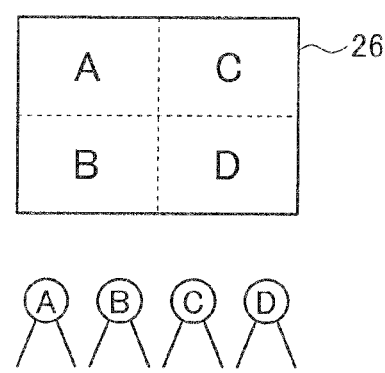

In a case where there are four users, the screen may be divided by four as shown in FIG. 7B so as to display a screen for each user corresponding to each region.

Note that the way in which the screen is divided is not limited to the examples shown in the figures. Rather, any method may be used as long as the number of divisions corresponds to the number of users. For example, in the case of three users, the screen may be divided into three sections widthwise, and in the case of four users, the screen may be divided either only lengthwise or only widthwise.

Figure 8:
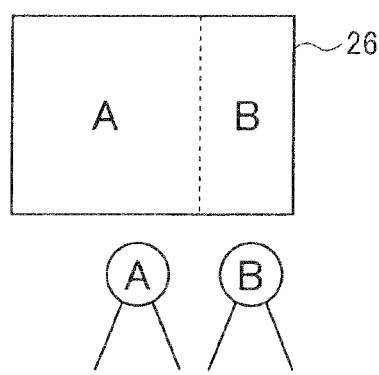
FIG. 8 illustrates an example of non-uniform screen division.

The divided regions do not necessarily need to be given the same surface areas. Rather, for example, the ratio of the surface areas may be determined based on the positions of users. For example, as shown in FIG. 8, in a case where user A is positioned near the center of the screen and user B is positioned somewhat to the right of the center of the screen, the screen may be divided so that the screen operated by user A is displayed on the left side and the screen operated by user B is displayed on the right side of the screen, with the screen operated by user A larger than that operated by user B. Furthermore, in a case where user B wants to change the ratio of the divided surface areas of the screen, the user B may move closer to the center of the screen so that the screens of user A and user B are displayed at equal ratios.

The ratio of the surface areas of divided regions may be determined based on the contents of the operations performed by users. For example, in a case where user A performs image editing work that requires detailed operations and user B performs work that does not require detailed operations, such as image selection work, the screen is divided so that the screen operated by user A is larger than that operated by user B.

Figure 9:
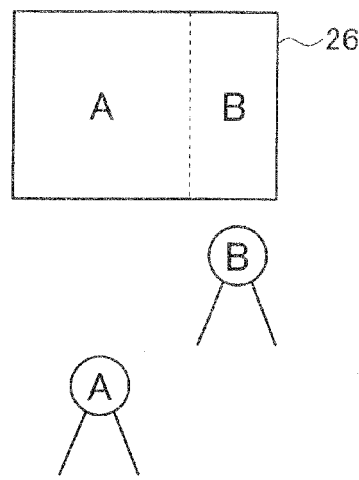
FIG. 9 illustrates an other example of non-uniform screen division.

Furthermore, when the ratio of the surface areas of the divided regions are determined based on the positions of users, the ratio may be determined based on the distances from the screen. For example, as shown in FIG. 9, when user A is positioned away from the screen at a range that permits screen operation by the operating unit 12 and user B is positioned closer to the screen than user A, the screen may be divided so that the screen operated by user A is larger than the screen operated by user B. Furthermore, the ratio of the divided surface areas for users A and B may be changed so as to have identical areas with each other by either user A moving closer to the screen or user B moving farther away form the screen.

With this arrangement, even in a case where a user is positioned far away from the screen, an easy-to-view screen display can be achieved.

In this manner, the ratio of the surface areas of divided regions may be dynamically changed in accordance with user positions and operation conditions using the method illustrated in FIGS. 8 and 9.

Next, the display method of the images in each user region obtained by dividing the screen using the aforementioned method will be described in detail. In the present invention, each divided region corresponds to a user and displays a screen corresponding to that user.

In the flowchart of FIG. 2, when screen division is completed in step S18, the images to be displayed in each divided region are identified and selected in step S20.

Figure 10:
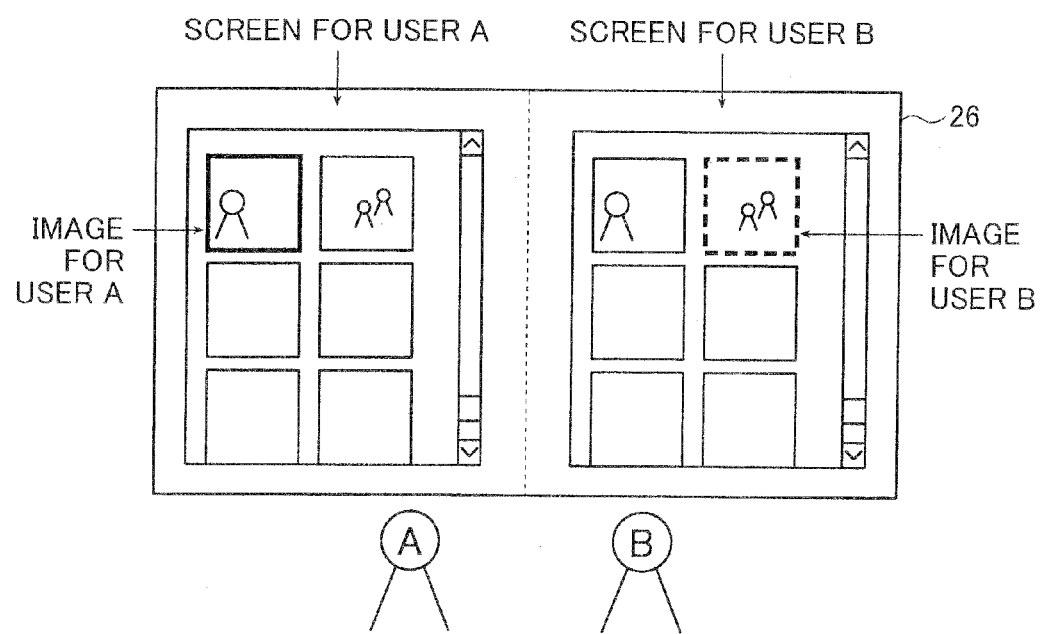
FIG. 10 illustrates an example of image display in operated regions.

FIG. 10 shows an example of the screen displays for each user. Here, a case where the screens are displayed when image prints are ordered is described as an example.

In FIG. 10, for user A and user B, the screen is divided based on user information, and user A is given the left half and user B is given the right half of the screen as the operation screens.

When screen division is completed, the process executing means 24 respectively displays the thumbnail images of the image group stored in the image storing means 22 in each region of users A and B. In the operated regions of users A and B, the displayed images are identical.

Furthermore, the process executing means 24 identifies and extracts the images relevant to each user from those available for display based on the user information received by the user information acquiring means 16.

Images may be extracted based on image facial detection, for example. That is, the process executing means 24 performs facial detection and facial recognition processing for each set of image data. Furthermore, the process executing means 24 crosschecks the facial image of each user obtained by the user information acquiring means 16 as user information and the face detected in each set of image data, and extracts the images recognized as those of the user as images relevant to that user.

Otherwise, the user identification information of the user who first uploaded (is in possession of) the image data for print ordering to the image storing means 22 may be stored in association with each set of image data and, based on that data, the images uploaded by the user may be identified as images relevant to that user and extracted.

Or, in a case where the operating unit 12 is a terminal provided with a photographing function, such as a cell phone, a facial image of the user may be taken by the operating unit 12 and used as user information.

When the images relevant to the users are extracted, the images relevant to the user operating each region are highlighted in the operated region for the user of the display means 26 in step S22.

This highlighting can be achieved by displaying frames that differ for each user around the images, as shown in FIG. 10, for example. In FIG. 10, the left half of the screen is the region operated by user A, and therefore the image among those within the left side region that is relevant to user A is surrounded by a bold frame. Similarly, the right half of the screen is the region operated by user B, and therefore the image among those within that region that is relevant to user B is surrounded by a dashed frame.

In this manner, highlighting the images relevant to each user makes it possible for each user to readily find images relevant to the user and smoothly select images for print ordering.

The method used for highlighting images may be any method as long as the method enables distinction between relevant images and non-relevant images. That is, rather than changing the frame design, image highlighting may be achieved by displaying the frame in different colors, displaying a symbol at a corner of an applicable image or near the image, or by enlarging an applicable image to a size greater than the other images, for example.

The user selects an image for which a print is to be ordered on the screen. Once the image is selected, the user notifies the image processing unit 14 of image selection completion using the operating unit 12 in step S24. Upon receipt of notification of completion, the image processing unit 14 adds the selected image to the print order.

In a case where the screen of the display means 26 is divided in accordance with the users, the number of users increases, the number of divisions of the screen also increases accordingly, resulting in a decrease in the surface area of each operated region. As a result, the screen display becomes harder to view as the number of users increases.

Here, in the present invention, an upper limit of the number of screen divisions may be preset, making it possible to maintain an easy-to-view screen by having a plurality of users use the same operated region.

Figure 11A:
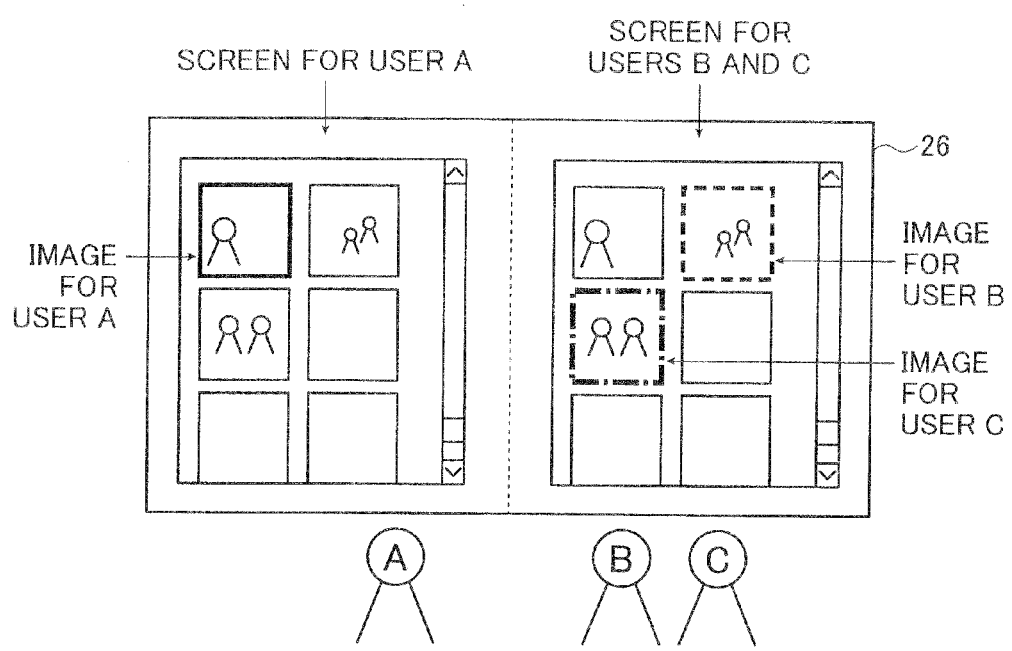
FIGS. 11A and 11B each illustrate an example of image display in operated regions when there are three users.
Figure 11B:
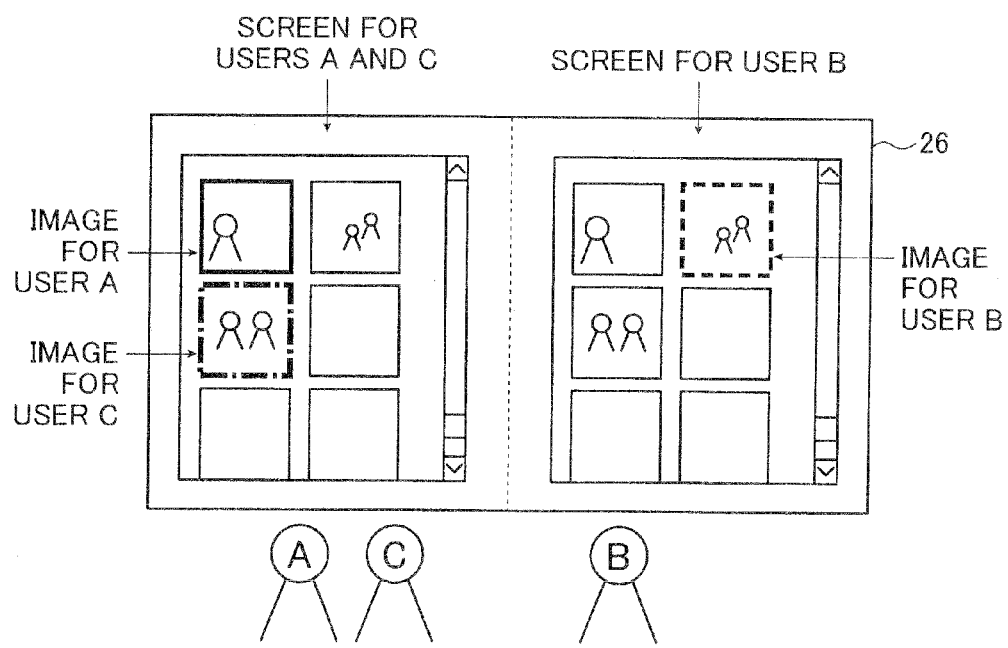

FIGS. 11A and 11B illustrate an example of a screen in a case where a plurality of users uses the same operated region. Here, the upper limit of the number of screen divisions is set to "two", and three users, users A, B, and C, use two operated regions.

First, as in FIG. 11A, when user A is positioned on the left side of the screen, and users B and C are positioned on the right side of the screen, the thumbnail images of the images stored in the image storing means 22 are displayed in each operated region.

In the region on the left side of the screen, images relevant to user A are highlighted with bold frames similar to FIG. 10 since this operated region is the region for user A. Furthermore, in the region on the right side of the screen, images relevant to user B are highlighted with dashed frames and images relevant to user C are highlighted with dashed-dotted frames. Users B and C can then perform screen operations, such as image selection, while viewing the operated region on the right side of the screen.

Furthermore, when, from the state of FIG. 11A, user C changes location and positions himself/herself on the left side of the screen, the screen display also changes accordingly. That is, as shown in FIG. 11B, the operated region on the left side of the screen is shared by users A and C, and the region on the right side of the screen is used by user B only. As a result, the images relevant to user A and user C are highlighted using bold frames and dashed-dotted frames, respectively, in the region on the left side of the screen, and the images relevant to user B are highlighted using dashed frames in the region on the right side of the screen.

In this manner, according to the method illustrated in FIGS. 11A and 11B, it is possible for a plurality of users to simultaneously work on the same screen in a case where a number of users greater than the number of divided regions is to perform work.

FIG. 12 illustrates another example of a case where a plurality of users uses the same operated region.

In FIG. 12, user A is positioned on the left side of the screen, user B is positioned on the right side of the screen of the display means 26 and user C is waiting to perform work. The display means 26 displays the region operated by user A on the left half of the screen and the region operated by user B on the right half of the screen. In this state, users A and B each perform screen operations to execute desired work.

When their work is completed, each of users A and B notifies the image processing unit 14 of work completion using the corresponding operating unit 12. The work completion notification may be executed by displaying a work finish button on the display means 26 and operating that button using the operating unit 12. Or, notification may be executed by pressing a button provided by the operating unit 12. Here, user B is assumed to have completed his/her work.

Upon receipt of the work completion notification, the process executing means 24 switches the screen display so that the region on the right half of the screen, which has been the region operated by user B, is the region operated by user C who had been waiting. The screen display may be switched automatically at the moment user B sends the work completion notification, or subsequently when user C positions himself/herself on the right side of the screen.

With this arrangement, even in a case where a number of users greater than the number of divided regions is performing work, it is possible to display a screen that is easy-to-view and easy-to-operate by each user.

While the images displayed in each of the operated regions are the same in the aforementioned screen display method, the present invention is not limited thereto, and the different images corresponding to each user may be displayed in each operated region. For example, only those images relevant to user A may be displayed in the region operated by user A.

Figure 13:
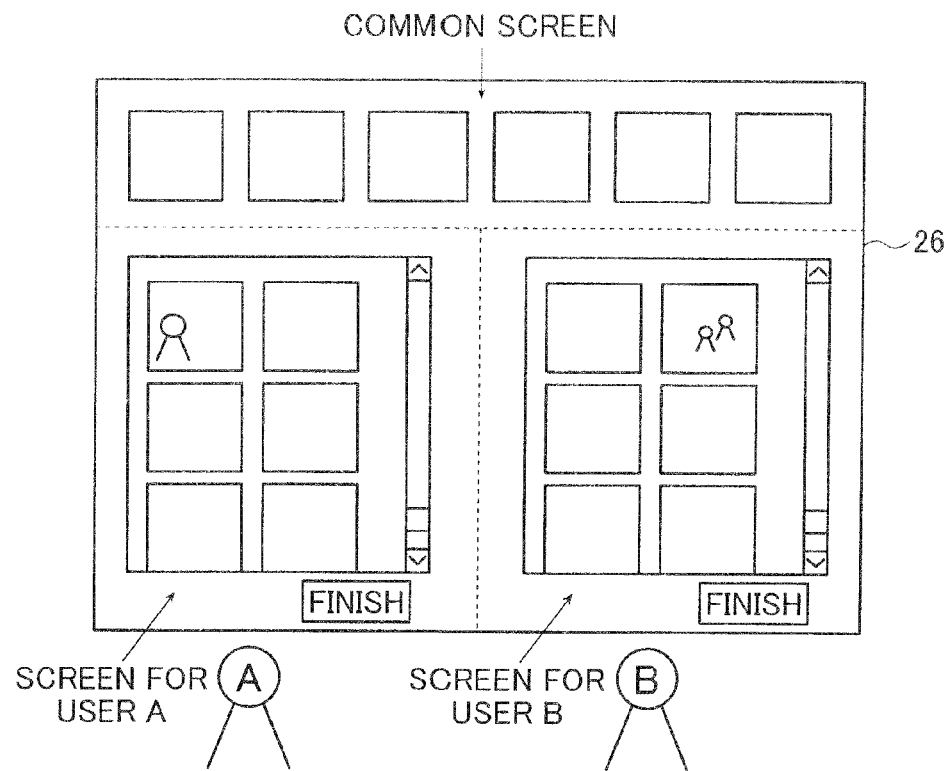
FIG. 13 illustrates an example of image display in operated regions when a common screen is included.

In such a case, a common screen for all users may be displayed in addition to the regions operated by each user. For example, as shown in FIG. 13, only those images relevant to user A are displayed in the region operated by user A on the left side of the screen, and only those images relevant to user B are displayed in the region operated by user B on the right side of the screen. A common screen region is then provided in the upper area of the screen, and displays those images not relevant to either user A or user B.

Further, while a plurality of images of the same size is displayed in each operated region in the examples of FIG. 10 to 13, the present invention is not limited thereto, and only those images selected by the user may be displayed in an enlarged format. In such a case, for example, a group of thumbnail images may be displayed in the upper area of the screen, and the images selected therefrom by each user may be displayed in enlarged format in the operated region of the user.

Figure 14:
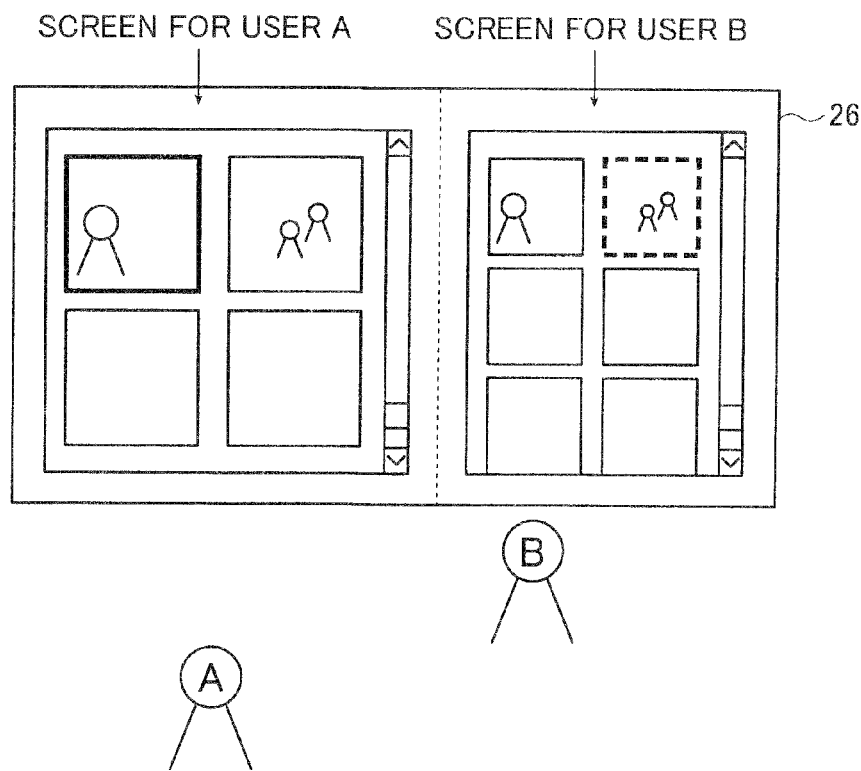
FIG. 14 illustrates an example of image display in operated regions in a case of nonuniform screen division.

Further, in a case where the screen is divided as in FIGS. 8 and 9, the display sizes of the images preferably change accordingly as well. For example, as shown in FIG. 14, in the operated region having a larger surface area, the image size displayed is also large, and in the operated region having a smaller surface area, the image size displayed is also small. As in the example of FIG. 9, in a case where the screen operated by a user positioned far away from the screen is displayed at an increased size, the user can easily view the images when the image size is also increased. Further, in a case where the screen is divided based on the contents of the operation performed by each user so that the screen operated by a user who performs image editing work that requires detailed operations is larger, the image size is also preferably increased accordingly.

In the present invention, the screen of the display means 26 is preferably divided and displayed using methods such as described above. Furthermore, in the aforementioned embodiment, since the screen divisions and display contents need to be updated each time a user position or work condition changes, the user information acquiring means 16 periodically acquires user information at a predetermined time interval.

Further, while the work performed by the user is assessed as ongoing until the user sends a work completion notification, in a case where the operating unit 12 is moved outside of the operable region for a certain period of time or longer, for example, the work may be regarded as completed to end the processing automatically.

Furthermore, while each user has one operating unit 12 in the aforementioned embodiment, the present invention is not limited thereto, and a plurality of users may share one operating unit. In such a case, when the user performs an operation, the user may set settings by executing a button operation or the like so that the user information of the operating unit 12 first switches to his or her own user information.

Further, while the images relevant to each user are highlighted in the aforementioned embodiment, the present invention is not limited thereto, and an image currently being processed or selected may be highlighted as well. Note that the display at this time is preferably a pattern different from the highlighting of relevant images.

In this manner, according to the present invention, it is possible to automatically divide the screen in accordance with the information and conditions of each user, and automatically change the division method in real-time in accordance with changes in user conditions, in a case where an application is simultaneously operated by a plurality of operating units. Furthermore, it is possible to display different contents for each user in each divided region corresponding to each user. Thus, the screen is effectively divided and displays are effective achieved in accordance with the information and conditions of each user, thereby making it possible to achieve an easy-to-view and easy-to-operate screen display.

While the above has described in detail the contents display device, contents display method, and program of the present invention, note that the present invention is not limited to the above embodiments and various modifications may be made without departing from the spirit and scope of the invention.

What is claimed is:

1. A contents display device configured to enable one or more users to perform screen operations of an application, comprising:
   a display unit;
   a plurality of operating units respectively that executes operations of a screen of the display unit;
   a contents storing unit that stores contents to be displayed on the screen;
   an operation information acquiring unit that acquires operation information related to an operating situation of each operating unit by the one or more users;
   a screen dividing unit that divides the screen into a plurality of regions and changes a ratio of surface areas of the regions based on the operation information acquired by the operation information acquiring unit; and
   a process executing unit that extracts contents related to the user operating each operating unit from those stored in the contents storing unit to display the extracted contents on the screen divided by the screen dividing unit, and that executes operations performed by each operating unit,
   wherein the operation information includes instruction information performing on the screen of the display unit, user identification information specific to each user operating each operating unit and position information indicating the position of the user with respect to the display unit,
   the operation information acquiring unit detects the number of the users or the number of the operated operating units from the user identification information,
   the screen dividing unit divides the screen into the plurality of regions based on the number of the users or the number of the operated operating units detected from the user identification information and changes the ratio of surface areas of each divided region based on the position information,
   the process executing unit extracts contents related to the user based on the instruction information and the corresponding user identification information, and
   when a user moves away from the display by a certain distance or more, the screen dividing unit cancels the display of the region operated by that user based on user position information, and there is a switch so as to display only the regions operated by the remaining users, and increasing the sizes of the regions operated by the remaining users.

2. The contents display device according to claim 1, wherein:

the screen dividing unit divides the screen based on the number of the users.

3. The contents display device according to claim 1, wherein:
the screen dividing unit divides the screen based on the number of the operated operating units.

4. The contents display device according to claim 1, wherein:
the operation information acquiring unit repeatedly acquires and sends to the screen dividing unit the operation information at a predetermined timing; and
the screen dividing unit divides the screen based on the operation information most recently received.

5. The contents display device according to claim 1, wherein the display unit displays in each of the plurality of regions of the screen divided by the screen dividing unit only contents extracted as those related to the user corresponding to the region by the process executing unit.

6. The contents display device according to claim 1, wherein the display unit displays in each of the plurality of regions of the screen divided by the screen dividing unit a plurality of contents and highlights the contents that are extracted as those related to the user corresponding to the region by the process executing unit.

7. The contents display device according to claim 1, wherein the display unit adjusts the size of the contents displayed on the screen divided by the screen dividing unit, in accordance with one of the user identification information and the position information.

8. A contents display method configured to enable one or more users to perform screen operations of an application, comprising the steps of:
acquiring, from a plurality of operating units for performing operations on a screen, operation information related to an operating situation of each operating unit by the one or more users;
dividing the screen into a plurality of regions and changing a ratio of surface areas of the regions based on the acquired operation information;
extracting contents related to the user operating each operating unit from those stored in advance;
displaying the extracted contents on the divided screen; and
executing operations performed by each operating unit,
wherein the operation information includes instruction information performing on the screen, user identification information specific to each user operating each operating unit and position information indicating the position of the user with respect to a display unit displaying the screen,
the number of the users or the number of the operated operating units is detected from the user identification information,
the screen is divided into the plurality of regions based on the number of the users or the number of the operated operating units detected from the user identification information and the ratio of surface areas of each divided region is changed based on the position information,
the contents related to the user are extracted based on the instruction information and the corresponding user identification information, and
when a user moves away from the display by a certain distance or more, the display of the region operated by that user is canceled based on user position information, and there is a switch so as to display only the regions operated by the remaining users, and increasing the sizes of the regions operated by the remaining users.

9. A non-transitory computer readable medium configured to store a program for executing on a computer, the program comprising the steps of:
acquiring, from a plurality of operating units respectively performing operations on a screen, operation information related to an operating situation of each operating unit by one or more users;
dividing the screen into a plurality of regions and changing a ratio of surface areas of the regions based on the acquired operation information;
extracting contents related to the user operating each operating unit from those stored in advance;
displaying the extracted contents on the divided screen; and
executing operations performed by each operating unit,
wherein the operation information includes instruction information performing on the screen, user identification information specific to each user operating each operating unit and position information indicating the position of the user with respect to a display unit displaying the screen,
the number of the users or the number of the operated operating units is detected from the user identification information,
the screen is divided into the plurality of regions based on the number of the users or the number of the operated operating units detected from the user identification information and the ratio of surface areas of each divided region is changed based on the position information, and
the contents related to the user are extracted based on the instruction information and the corresponding user identification information, and
when a user moves away from the display by a certain distance or more, the display of the region operated by that user is canceled based on user position information, and there is a switch so as to display only the regions operated by the remaining users, and increasing the sizes of the regions operated by the remaining users.

10. The contents display device according to claim 1, wherein when the user that moved away returns to a position where the display is one again operable, the screen dividing unit may split the screen and display the respective screens operated by the users.

11. The contents display device according to claim 1, wherein the contents of the screen of the user that moved away is temporarily stored.

12. The contents display device according to claim 11, wherein the screen is divided based on the physical features of the users.

13. The contents display device according to claim 1, wherein the physical features of the users include age or height.

14. The method according to claim 8, wherein when the user that moved away returns to a position where the display is one again operable, the screen may be split and display the respective screens operated by the users.

15. The method according to claim 8, wherein the contents of the screen of the user that moved away is temporarily stored.

16. The method according to claim 8, wherein the screen is divided based on the physical features of the users.

17. The method according to claim 16, wherein the physical features of the users include age or height.

18. The medium according to claim 9, wherein when the user that moved away returns to a position where the display is one again operable, the screen may be split and display the respective screens operated by the users.

19. The medium according to claim 9, wherein the contents of the screen of the user that moved away is temporarily stored.

20. The medium according to claim 9, wherein the screen is divided based on the physical features of the users.

21. The medium according to claim 9, wherein the physical features of the users include age or height.

* * * * *